United States Patent
Parlow et al.

(10) Patent No.: US 9,604,578 B2
(45) Date of Patent: Mar. 28, 2017

(54) VEHICLE TRIM PANEL ASSEMBLY WITH TAPERED ACCOMMODATION AND RETRIEVAL SLOT

(71) Applicant: FORD GLOBAL TECHNOLOGIES, LLC, Dearborn, MI (US)

(72) Inventors: Kathleen M. Parlow, Columbus, MI (US); Scott Holmes Dunham, Redford, MI (US); Elizabeth Cleary Johnston Tengler, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/602,858

(22) Filed: Jan. 22, 2015

(65) Prior Publication Data

US 2016/0214540 A1 Jul. 28, 2016

(51) Int. Cl.
| | |
|---|---|
| *B60R 7/00* | (2006.01) |
| *B60R 13/02* | (2006.01) |
| *B60R 7/04* | (2006.01) |
| *B60R 11/02* | (2006.01) |
| *B60R 11/00* | (2006.01) |

(52) U.S. Cl.
CPC ............ *B60R 7/04* (2013.01); *B60R 11/02* (2013.01); *B60R 13/02* (2013.01); *B60R 2011/0075* (2013.01); *B60R 2013/0287* (2013.01)

(58) Field of Classification Search
CPC .. B60R 11/00; B60R 7/00; B60R 7/06; B60R 7/046; B60R 7/12; B60R 2011/0003; B60R 2011/0005; B60R 7/02; B60R 21/045; B60N 2/466; B60N 2/4686; B62D 25/04

USPC ..... 296/39.1, 39.2, 1.08, 193.06, 37.7, 37.1, 296/37.12, 37.8, 37.9, 37.13, 37.16
See application file for complete search history.

(56) References Cited

U.S. PATENT DOCUMENTS

| | | | | |
|---|---|---|---|---|
| 5,507,610 A | * | 4/1996 | Benedetti | F16B 5/0628 24/297 |
| 5,562,321 A | * | 10/1996 | VanHoose | B62D 33/0273 296/37.16 |
| 5,588,631 A | * | 12/1996 | Yee | B60R 11/06 211/4 |
| 5,855,310 A | * | 1/1999 | Van Ert | B60R 11/06 224/275 |
| 6,719,343 B2 | * | 4/2004 | Emerling | B60N 2/4686 224/539 |

(Continued)

FOREIGN PATENT DOCUMENTS

| | | |
|---|---|---|
| DE | 19727007 B4 | 4/2010 |
| EP | 1974966 A3 | 5/2009 |
| KR | 100219469 B1 | 9/1999 |

OTHER PUBLICATIONS

English machine translation of the description for DE19727007.
English machine translation of the description for EP1974966.
English machine translation of the description for KR100219469.

*Primary Examiner* — Dennis H Pedder
(74) *Attorney, Agent, or Firm* — Vichit Chea; King & Schickli, PLLC

(57) ABSTRACT

A vehicle trim panel assembly includes a body defining a storage compartment and an access opening to that storage compartment. The body includes a front storage compartment wall. The access opening is provided in communication with the storage compartment. Further the body includes a slot in the front wall that is open to the access opening and in communication with the storage compartment.

16 Claims, 4 Drawing Sheets

(56) References Cited

U.S. PATENT DOCUMENTS

| | | | |
|---|---|---|---|
| 7,188,882 B2 | 3/2007 | Dry | |
| 8,291,553 B2 * | 10/2012 | Moberg | B60J 5/0468 |
| | | | 24/297 |
| 8,505,794 B2 * | 8/2013 | Ardigo | B60N 2/466 |
| | | | 224/543 |
| 9,216,703 B2 * | 12/2015 | Lauxen | B60R 13/0206 |
| 2007/0241582 A1 | 10/2007 | McKeever | |
| 2008/0073927 A1 | 3/2008 | Schoemann et al. | |
| 2008/0169667 A1 * | 7/2008 | Siniarski | B60N 3/002 |
| | | | 296/37.8 |
| 2009/0250911 A1 * | 10/2009 | Sia, Jr. | B60R 13/025 |
| | | | 280/728.3 |
| 2011/0309649 A1 * | 12/2011 | Yamase | B60R 13/0853 |
| | | | 296/57.1 |

* cited by examiner

VEHICLE TRIM PANEL ASSEMBLY WITH TAPERED ACCOMMODATION AND RETRIEVAL SLOT

TECHNICAL FIELD

This document relates generally to the vehicle equipment field and, more particularly, to a new and improved vehicle trim panel incorporating a tapered accommodation and retrieval slot.

BACKGROUND

Motor vehicle users are always looking for convenient places to store and hold personal items such as wallets, cell phones, electronics, flashlights, sports equipment such as golf balls, suntan lotion, eye drops and the like. In many cases the typical storage options designed into motor vehicles, including, for example, glove boxes, console bins, console cup holders, instrument panel, center stack storage compartments, door map pockets, seatback pockets and the like either do not provide enough dedicated storage or are simply not versatile enough to provide the best possible option. Further, these dedicated storage options are typically fixed and non-configurable to best meet the needs of the user. Further, most are focused upon storage within reach of the driver or front row passenger and are not conveniently available to rear seat occupants. As a result it is clear that a need exists for additional storage options in the interior trim of a motor vehicle.

SUMMARY

In accordance with the purposes and benefits described herein, a vehicle trim panel assembly is provided comprising a body that defines a storage compartment and a related access opening. That body includes a front storage compartment wall. In one possible embodiment, the access opening is provided behind the front storage compartment wall. Further, the body includes a slot in the front wall. The slot is open to the access opening and is also in communication with the storage compartment.

More specifically, the access opening is in communication with a top of the storage compartment while the slot is in communication with a front of the storage compartment. In one possible embodiment, the slot includes a tapered portion. More specifically, the tapered portion of the slot includes opposing edges or retention lips that converge toward one another from a top of the slot toward a bottom of the slot.

In another possible embodiment, the slot includes a bottom portion defining an opening that is wider than the tapered portion. In any of the embodiments, the front storage compartment wall is made flexible by the slot so as to be capable of expanding to accommodate items to be stored in the storage compartment.

In one possible embodiment, the slot includes opposing lips having non-slip gripping material such as an overmolded thermoplastic elastomer. Further, the gripping material may include opposed fins to aid in better securing an object or item in the slot.

In accordance with an additional aspect, a vehicle trim panel assembly comprises a body including a storage compartment. That storage compartment has a front wall, a rear wall, an access opening between the front wall and the rear wall and a slot in the front wall. The slot is open to the access opening and in communication with the storage compartment.

The access opening extends in a first plane and the slot extends in a second plane in communication with a front of the storage compartment. Further, the slot includes a tapered portion having opposed wall edges or lips. Those lips converge toward one another from a first end of the slot in communication with the access opening toward a second end of the slot.

A second portion may be provided at the second end of the slot. That second portion defines an opening wider than the tapered portion.

In one possible embodiment, the access opening in the first place is substantially perpendicular to the slot in the second plane. In one possible embodiment, the front wall includes at least one live hinge to increase flexibility. In one possible embodiment that live hinge extends in a direction substantially parallel to the slot.

In the following description, there are shown and described several preferred embodiments of the vehicle trim panel assembly. As it should be realized, the vehicle trim panel assembly is capable of other, different embodiments and its several details are capable of modification in various, obvious aspects all without departing from assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle trim panel assembly and together with the description serve to explain certain principles thereof. In the drawing figures.

Figure 4A:
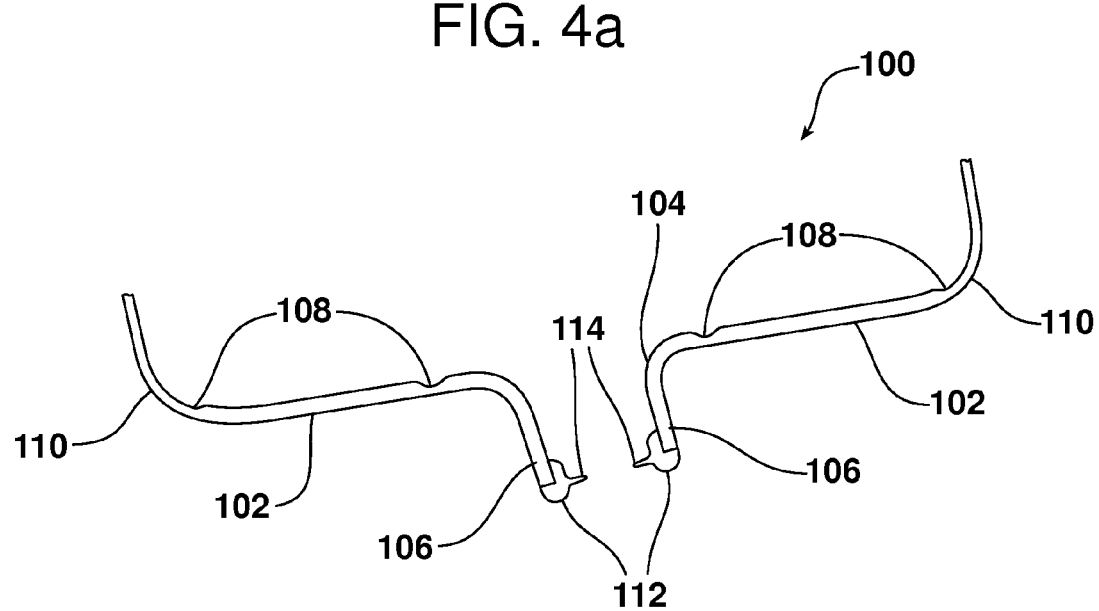
Figure 4B:
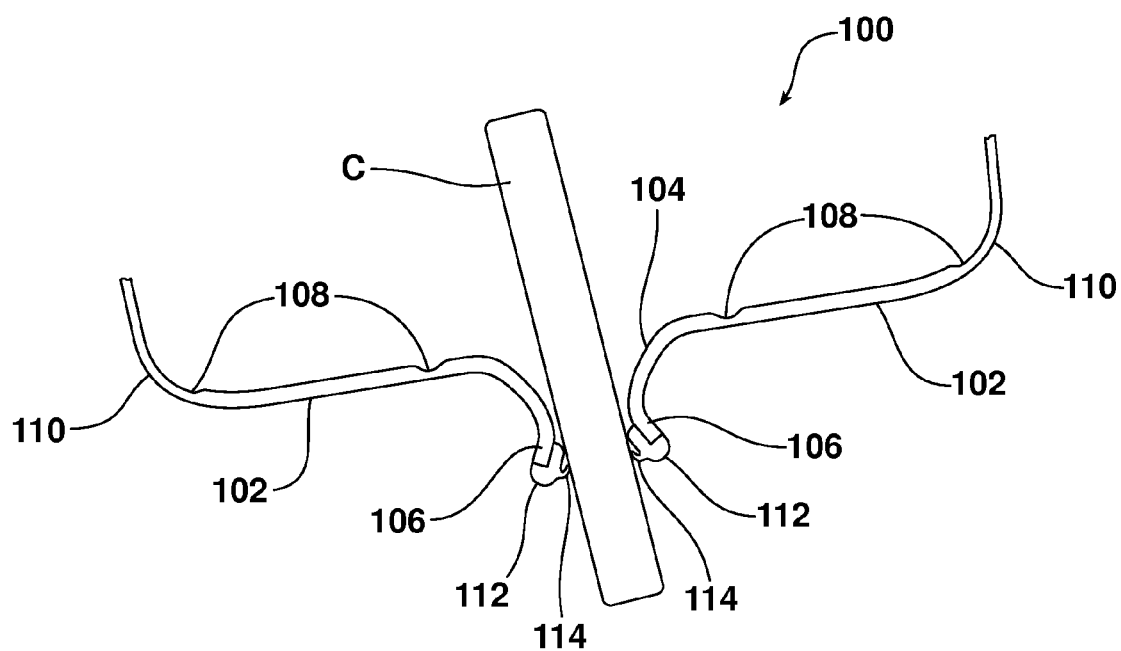

FIGS. 4*a* and 4*b* are detailed plan views of yet another alternative embodiment including lips overmolded with a gripping material. FIG. 4*a* illustrates the alternative embodiment in its home position. FIG. 4*b* illustrates the embodiment holding a cell phone and showing how the flanges flex open and the gripping material engages and holds the cell phone.

Reference will now be made in detail to the present preferred embodiments of the vehicle trim panel, examples of which are illustrated in the accompanying drawing figures.

DETAILED DESCRIPTION

Figure 1:
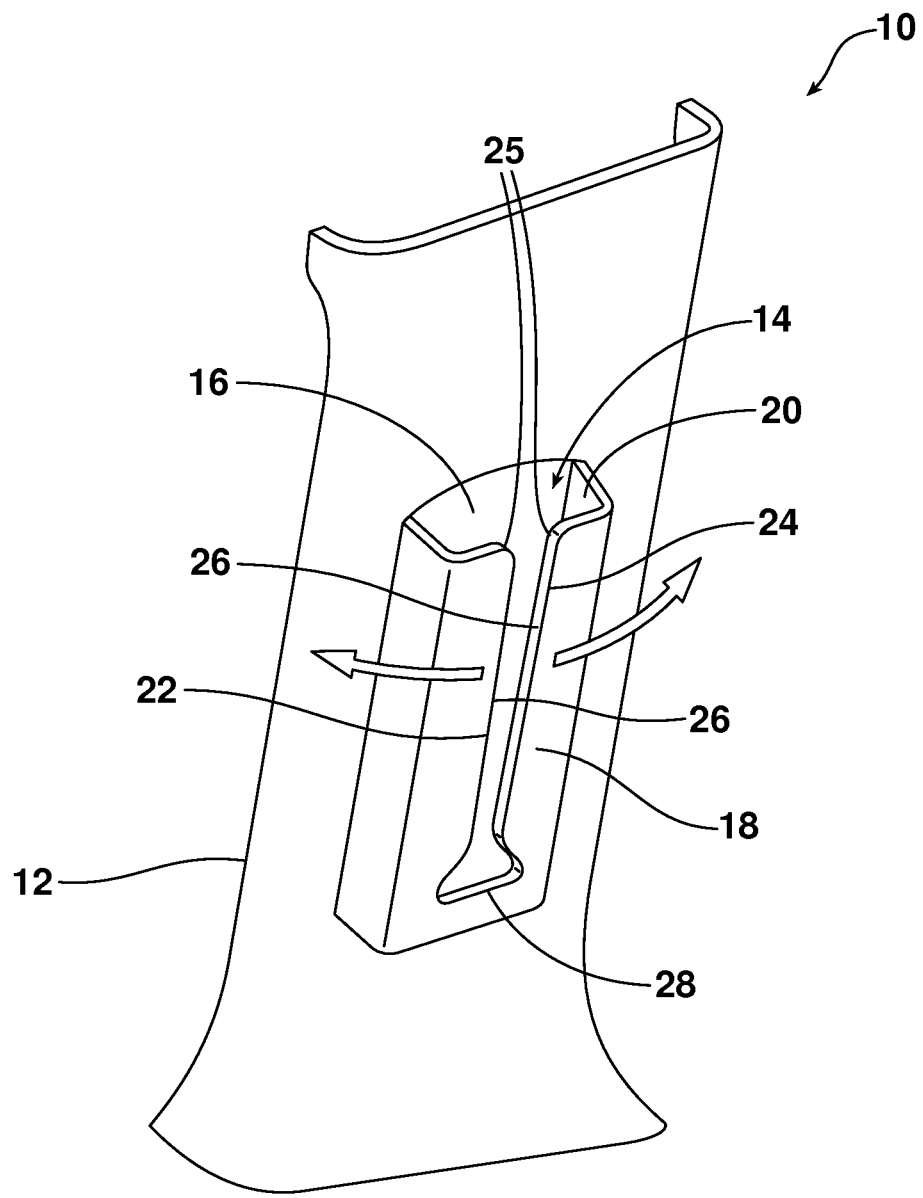
FIG. 1 is a perspective view of the vehicle trim panel assembly clearly illustrating the front wall, rear wall and access opening of the storage compartment formed in that panel assembly as well as the tapered accommodation and retrieval slot formed in the front wall thereof.
Figure 2:
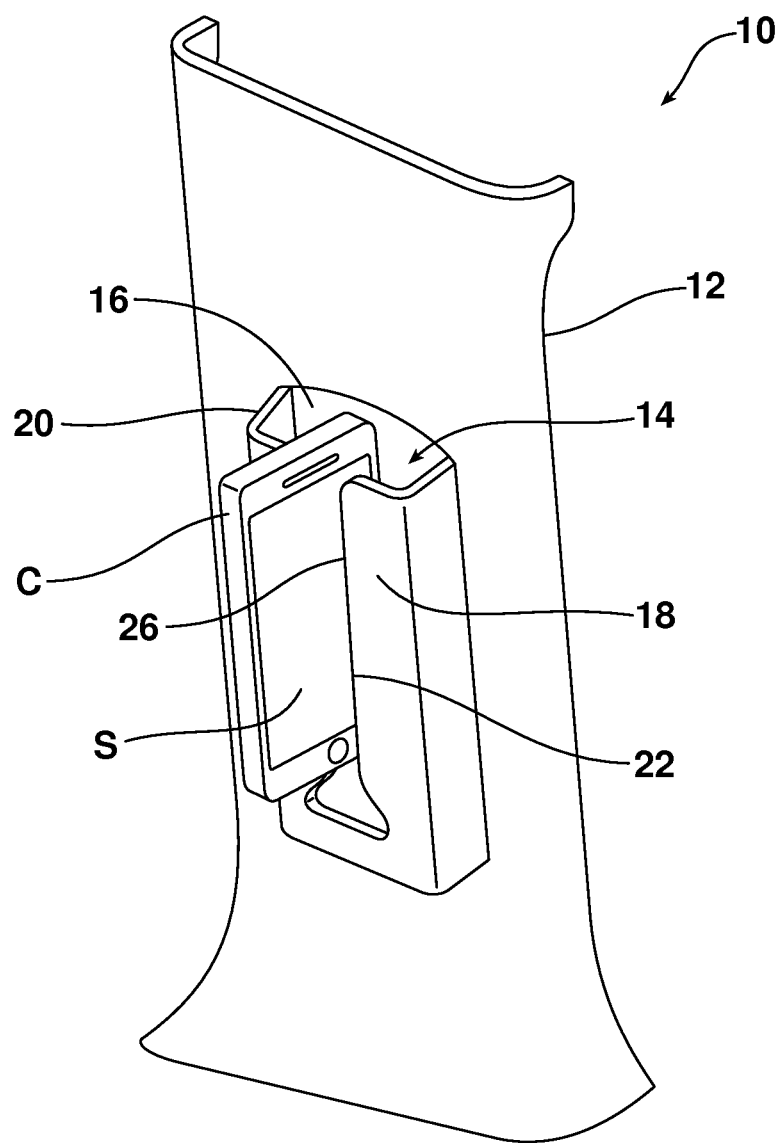
FIG. 2 is a view similar to FIG. 1 illustrating how an electronic device such as a cell phone may be wedged into and held in the accommodation slot where it may be easily accessed.

Reference is now made to FIGS. 1 and 2 illustrating the vehicle trim panel assembly 10. As illustrated, the vehicle trim panel comprises a body 12 that is formed and shaped to cover a pillar of a motor vehicle. More specifically, the body 12 may be molded from any appropriate plastic or composite material including those reinforced with glass fibers, carbon nanotubes or other reinforcement material.

As further illustrated, the body 12 defines an internal storage compartment 14 with a rear wall 16, a front wall 18 and an access opening 20 behind the front wall/between the rear wall and front wall. This access opening 20 is in communication with and provides full access to the storage compartment 14.

A tapered accommodation and retrieval slot 22 is provided in the front wall 18. The upper, tapered portion 24 of the slot 22 includes opposing wall edges, lips or edge walls 26 converging toward one another from a top of the slot in communication with the access opening 20 toward a bottom of the slot.

Further, in the illustrated embodiment, the slot 22 includes a bottom portion 28 that defines an opening that is wider than the tapered portion 24. This portion 28 serves two purposes. First, it provides stress/strain relief for the slot 22 allowing the body 12 to flex and be more resilient. Second, it allows for access, leverage and retrieval to extract items stored in the slot 22 that may be small (golf balls for example). Advantageously, the slot 22 is suitably sized and shaped to provide an increased degree of flexibility to the front wall 18 thereby allowing the front wall to expand and accommodate an item such as an umbrella which has a diameter slightly larger than the depth of the access opening 20. The resilient nature of the front wall 18 ensures that positive retaining force is maintained on the umbrella to hold it in position in the storage compartment 14 and prevent moving around in the slot and rattling during operation of the vehicle. Of course, when the umbrella is withdrawn from the access opening 20, the front wall 18 resumes its normal shape through resilient memory.

As illustrated in FIG. 2, the tapered accommodation and retrieval slot 22 also provides an effective structure for receiving and holding items where they may be readily accessed by a vehicle occupant. More specifically, an electronic device such as the cell phone C, may be inserted into the top of the slot 22 at the access opening 20 and pushed downwardly until the lips or edge walls 26 of the tapering slot tightly engage the cell phone C and hold it in position. As should be appreciated, the cell phone C is held in position with a substantial portion of the device extending forwardly from the slot 22 beyond the front wall 18 of the trim panel assembly 10 where it may easily be engaged and accessed by a vehicle occupant as needed.

Figure 3:
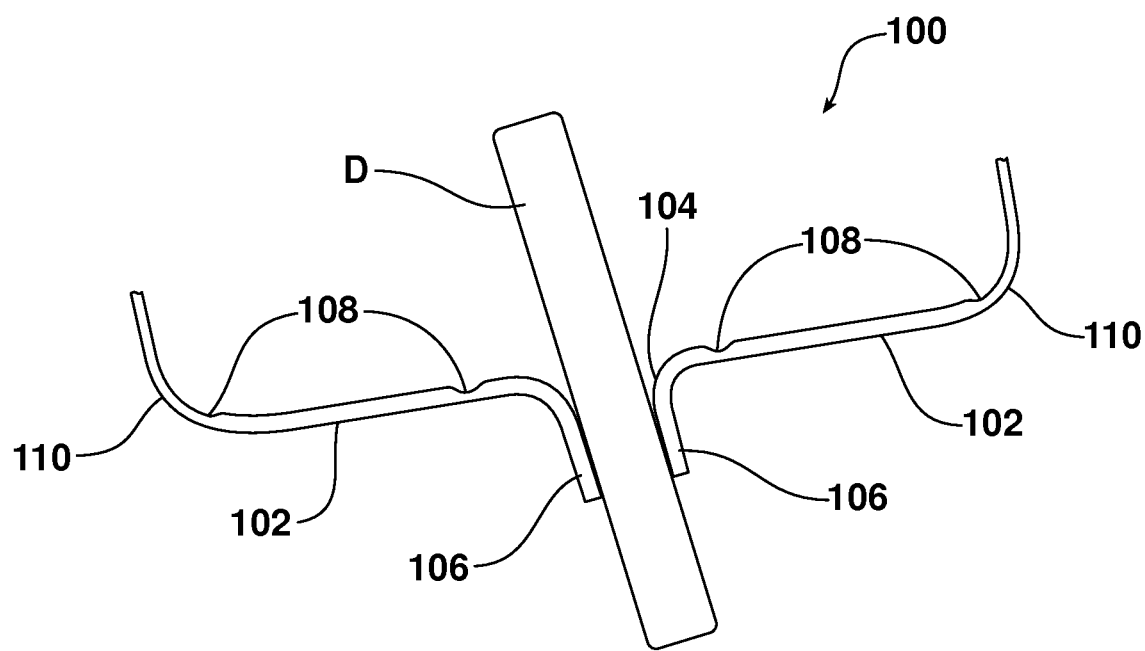
FIG. 3 is a detailed top plan view of an alternative embodiment of the panel assembly wherein the slot incorporates enlarged lips or edge walls to better grasp an article held in the slot.

Reference is now made to FIG. 3 which illustrates an alternative embodiment of panel 100. In this embodiment, the front wall 102 includes a tapered slot 104 incorporating enlarged lips 106 formed as flanges or edge walls. These lips/flanges 106 provide more surface area than a simple wall edge and, therefore, better grip and hold an item such as the illustrated music device.

As further illustrated in FIG. 3, the front wall 102 includes a series of spaced living hinges 108 to add additional flexibility to the front wall. In the illustrated embodiment, the flexible hinges are provided adjacent each lip/flange 106 and each front wall corner 110. Further, the living hinges 108 extend substantially parallel to the tapered slot 104.

FIGS. 4a and 4b illustrate yet another embodiment wherein the lips or flanges 106 defining the slot 22 include non-slip gripping material 112. In one particularly useful embodiment the gripping material 112 is a thermoplastic elastomer such as neoprene. One useful material for this purpose is sold under the Santoprene trademark. Further, the material includes opposed, molded fins 114.

The fins 114 are similar to wiper blades in thickness and provide for enhanced retention of an item or object in the slot 22. More specifically, as illustrated in FIG. 4b, the fins 114 flex to conform to and grip the object (note cell phone C). In addition, the material 112/fins 114 also provide shock absorption and mar resistance.

In summary, the vehicle trim panel assembly 10 provides a number of benefits and advantages. The tapered accommodation and retrieval slot 22 provided in the front wall 18 of the storage compartment 14 provides added flexibility to the front wall allowing the front wall and the access opening to be expanded in order to accommodate larger items while the resilient memory the front wall ensures that those items are positively held in position. Further, as illustrated in FIGS. 2 and 3, the slot 22, 104 may also securely hold and accommodate items such as electronic devices (e.g. cell phone, music device, navigation device) where they may be easily accessed from the front wall 18 of the storage compartment 14. As further illustrated in FIG. 2, the screen S of the electronic device is at least partially visible when the device is held in the slot 22 thereby allowing a vehicle occupant to visually check the screen for an incoming message if desired without having to remove the device from the storage compartment 14. The rounded corners 25 at the top of the slot 22 function as cam surfaces to guide any item into the slot as it is pushed downwardly until the tapered walls 26 of the slot secure it in position.

The foregoing has been presented for purposes of illustration and description. It is not intended to be exhaustive or to limit the embodiments to the precise form disclosed. Obvious modifications and variations are possible in light of the above teachings. For example, the slot 22 in the front wall 18 of the body 12/storage compartment 14 may assume a different shape than that illustrated in drawing FIGS. 1 and 2. Further, while a vehicle trim panel assembly 10 for covering a pillar has been shown and described, it should be appreciated that the trim panel may be provided in other locations within the vehicle including, but not necessarily limited to, the hard trim (quarter, cowl, console, valence panels, hard seat backs, rear face of the center console, glove box lid and the like). All such modifications and variations are within the scope of the appended claims when interpreted in accordance with the breadth to which they are fairly, legally and equitably entitled.

What is claimed is:

1. A vehicle trim panel assembly, comprising:
    a body defining a storage compartment and a first access opening in communication with and providing full access to said storage compartment, said body further including;
    a front storage compartment wall; and
    a slot in said front wall open to said first access opening and in communication with said storage compartment, said slot tapering from an upper portion to a bottom portion including a second access opening,
    whereby the second access opening providing relief for the slot by allowing the body to flex and allowing access and retrieval for items stored in the slot.

2. The panel assembly of claim 1, wherein said first access opening is in communication with a top of said storage compartment and said slot is in communication with a front of said storage compartment.

3. The panel assembly of claim 2, wherein said tapered portion of said slot includes opposing lips converging toward one another from a top of said slot in communication with said first access opening toward a bottom of said slot.

4. The panel assembly of claim 3, wherein said second access opening is wider than said tapered portion.

5. The panel assembly of claim 4, wherein said front storage compartment wall is flexible.

6. The panel assembly of claim 1, wherein said slot includes opposing lips including non-slip gripping material.

7. The panel assembly of claim 6, wherein said non-slip gripping material is an overmolded thermoplastic elastomer.

8. The panel assembly of claim 7, wherein said opposing lips converge toward one another from a top of said slot in communication with said first access opening toward a bottom of said slot and wherein non-slip gripping material includes opposed fins.

9. A vehicle trim panel assembly, comprising:
a body including an internal storage compartment having a front wall, a rear wall, a top access opening between said front wall and said rear wall and a retrieval slot provided in said front wall open to said top access opening and in communication with said storage compartment, said slot tapered from an upper portion to a bottom portion defining a bottom access opening wider than the tapered slot.

10. The panel assembly of claim 9, wherein said top access opening extends in a first plane and said slot extends in a second plane in communication with a front of said storage compartment.

11. The panel assembly of claim 10, wherein said tapered slot includes opposing lips converging toward one another from a first end of said slot in communication with said top access opening toward a second end of said slot.

12. The panel assembly of claim 11, wherein said front storage compartment wall is flexible.

13. The panel assembly of claim 10, wherein said first plane is substantially perpendicular to said second plane.

14. The panel assembly of claim 11, wherein said opposed lips include non-slip gripping material.

15. The panel assembly of claim 10, wherein said front wall further includes at least one living hinge to add flexibility.

16. The panel assembly of claim 15, wherein said at least one living hinge extends substantially parallel to said slot.

* * * * *